(12) United States Patent
Otome (10) Patent No.: US 6,928,118 B1
(45) Date of Patent: Aug. 9, 2005

(54) DEVICE AND METHOD FOR DISPLAYING VIDEO

(75) Inventor: Takashi Otome, Sapporo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,538

(22) PCT Filed: Jan. 28, 2000

(86) PCT No.: PCT/JP00/00451

§ 371 (c)(1),
(2), (4) Date: Oct. 2, 2000

(87) PCT Pub. No.: WO00/46783

PCT Pub. Date: Aug. 10, 2000

(30) Foreign Application Priority Data

Feb. 2, 1999 (JP) .......................................... 11/024663

(51) Int. Cl.[7] .............................................. H04N 7/18
(52) U.S. Cl. .............................. 375/240.21; 375/240.25
(58) Field of Search ................................ 348/563, 552, 348/564, 567, 569, 589, 598, 599, 441, 453; 345/114, 115, 116, 191, 88

(56) References Cited

U.S. PATENT DOCUMENTS

| | | | |
|---|---|---|---|
| 5,959,685 A | | 9/1999 | Yoshimi |
| 5,969,727 A | * | 10/1999 | Kaneko .................... 345/536 |
| 6,097,437 A | * | 8/2000 | Hwang ....................... 348/441 |
| 6,195,078 B1 | * | 2/2001 | Dinwiddie et al. ......... 345/636 |
| 6,300,982 B1 | * | 10/2001 | Koh ........................... 348/569 |
| 6,310,597 B1 | * | 10/2001 | Kim ............................. 345/98 |
| 6,421,094 B1 | * | 7/2002 | Han ........................... 348/569 |

FOREIGN PATENT DOCUMENTS

| | | |
|---|---|---|
| JP | 2-93586 | 4/1990 |
| JP | 2-157798 | 6/1990 |
| JP | 03-050977 | 3/1991 |
| JP | 03-181288 | 8/1991 |
| JP | 6-319077 | 11/1994 |
| JP | 09-163257 | 6/1997 |

* cited by examiner

*Primary Examiner*—Andy Rao
(74) *Attorney, Agent, or Firm*—Wenderoth, Lind & Ponack, L.L.P.

(57) ABSTRACT

A video display apparatus and method capable of providing, even if an on-screen display device that operates only on a clock lower in speed than a dot clock synchronized with a video signal is used, high-definition on-screen display based on the dot clock. Based on a signal outputted from a control signal generator 1, a line memory 3 writes the on-screen signal outputted from an OSD generator 2 on a clock (CK2) lower in speed than the dot clock of the video signal, and reads the same on a clock (CK1) synchronized with the dot clock of the video signal. A switching part 4 inserts the on-screen signal synchronized with the dot clock of the video signal outputted from the line memory 3 into a predetermined period of the video signal by selectively switching outputs.

8 Claims, 7 Drawing Sheets

DEVICE AND METHOD FOR DISPLAYING VIDEO

TECHNICAL FIELD

The present invention relates to video display apparatuses and methods and, more specifically, to a video display apparatus and method for providing video display of various video signals such as a computer signal, NTSC signal, and high-definition signal, and also providing on-screen display.

BACKGROUND ART

In recent years, advanced information processing has promoted penetration of devices such as word processors and personal computers into offices and homes. Especially, in recent devices, their display-screens become larger with higher definition in order to display more information. The higher the definition of the display screen becomes, the higher in speed a dot clock of a video signal becomes.

Generally, in these devices, characters are on-screen-displayed on the display screen for displaying, for example, setting of contrast and brightness of a display, or displaying volume and a channel for a television receiver.

Figure 7:
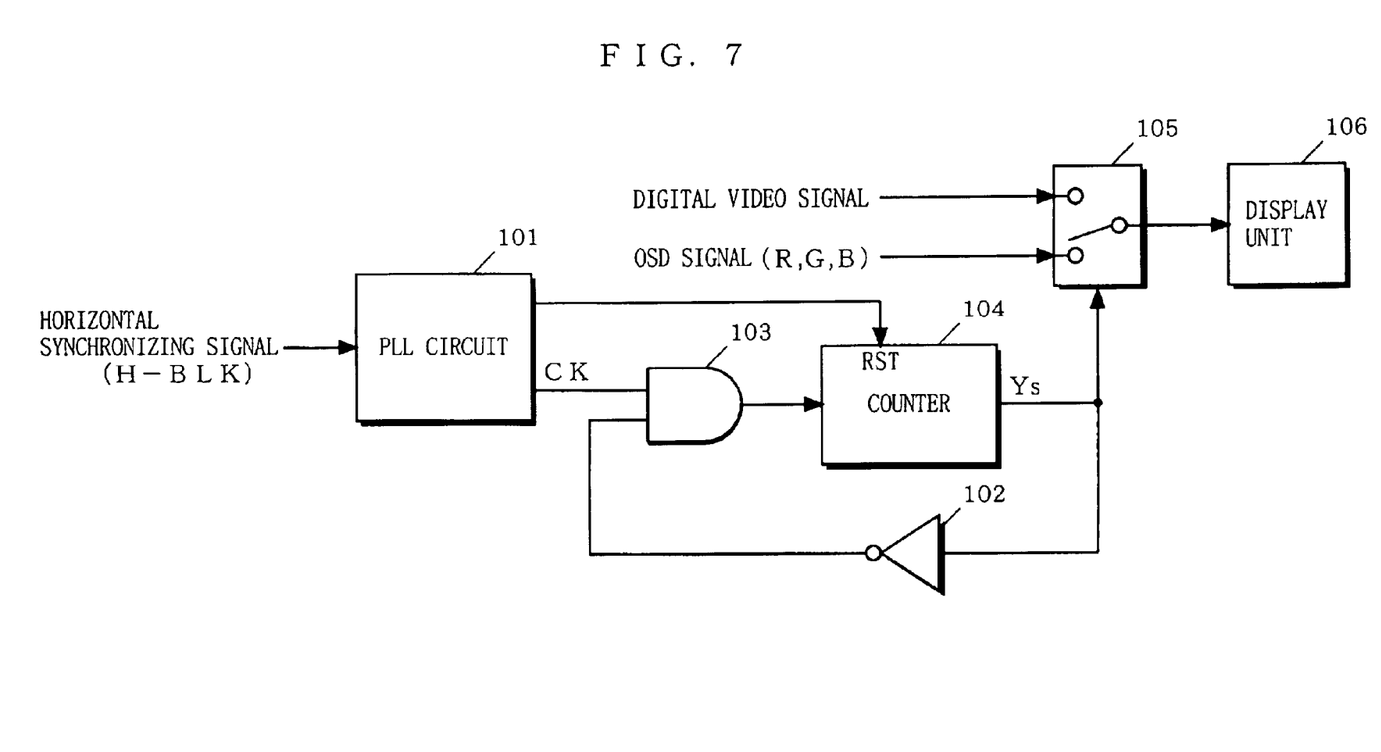
FIG. 7 is a block diagram showing the structure of a conventional video display apparatus.

Conventionally, a video display apparatus for the above on-screen display disclosed in Japanese Patent Laid-Open Publication No. 6-319077 (1994-319077) (hereinafter referred to as background art document) is widely known. FIG. 7 is a block diagram showing the structure of the conventional video display apparatus disclosed in this background art document.

In FIG. 7, the conventional video display apparatus includes a PLL circuit 101, an inverter (NOT) circuit 102, a logical multiplication (AND) circuit 103, a counter 104, a switching part 105, and a display unit 106.

The PLL circuit 101 receives a horizontal blanking signal (H-BLK) synchronized with a video signal, and generates a clock of a constant frequency according to H-BLK. Based on the clock generated by the PLL circuit 101, the counter 104 generates a $Y_s$ signal that provides a position of the first character of an on-screen signal (period for on-screen display) to control switching of the switching part 105. Following the control by the $Y_s$ signal outputted from the counter 104, the switching part 105 switches between the video signal and on-screen signal, and outputs the on-screen signal to the display unit 106 only during the period for on-screen display.

In general, such devices that selectively output the $Y_s$ signal and on-screen signal by receiving the synchronizing signal such as H-BLK are widely available on the market.

Also, as well known, if a dot clock speed of the received video signal is high, parallel processing in, for example, two-phases, are carried out to increase a speed for processing video signals by decreasing an input clock speed of a display driver.

As stated above, as the definition for various video signals becomes higher, display characters with higher definition are required for on-screen display. Therefore, the on-screen signal has to operate on a clock synchronized with the dot clock of the video signal.

However, actual on-screen display devices do not meet the above requirement. Also, even if the on-screen display device operates at a desired clock frequency, it is difficult for the on-screen display device to interface with a video display processing circuit for inserting the on-screen signal into the video signal. Moreover, when the on-screen signal is inserted into the video signal subjected to the above parallel processing, the resolution per character is decreased.

Therefore, an object of the present invention is to provide a video display apparatus and method capable of providing, even if an on-screen display device that operates only on a clock lower in speed than a dot clock synchronized with a video signal that is used, high-definition on-screen display based on the dot clock.

DISCLOSURE OF THE INVENTION

To achieve the above objects, the present invention has the following aspects.

A first aspect is directed to a video display apparatus for inserting a predetermined on-screen signal into a video signal. The video display apparatus in accordance with the first aspect of the present invention comprises an OSD generating part for generating the predetermined on-screen signal, a dual-port line memory for writing the on-screen signal outputted from the OSD generating part in synchronization with a write clock (which is lower in speed than a read clock) and reading the written on-screen signal in synchronization with the read clock which is a dot clock of the video signal and a switching part for inserting the on-screen signal read by the line memory into a predetermined period of the video signal.

As described above, according to the first aspect, the dual-port line memory is used. The on-screen signal is written once in the line memory on a conventional clock of low speed, and then read on a clock of high speed synchronized with the video signal. Therefore, even if an on-screen display device that operates only on a clock lower in speed than the dot clock synchronized with the video signal that is used, a high-definition on-screen display can be made based on the dot clock.

A second aspect is directed to a video display apparatus for inserting predetermined on-screen signals into a plurality of video signals processed in parallel. The video display apparatus in accordance with the second aspect of the present invention comprises an OSD generating part for generating the predetermined on-screen signals, a plurality of dual-port line memories for writing the on-screen signals outputted from the OSD generating part in synchronization with each predetermined write clock (which is lower in speed than a read clock) and reading the written on-screen signals in synchronization with the read clock which is a dot clock of the video signal, a control part for controlling timing of each write clock so that the plurality of line memories can carry out write processing in parallel and a plurality of switching parts for inserting the on-screen signals read by the plurality of line memories into predetermined periods of the plurality of video signals.

As described above, according to the second aspect, the plurality of dual-port line memories are used. The on-screen signals are written once in parallel in the plurality of line memories on a conventional clock of low speed, and then read in parallel on a clock of high speed synchronized with the video signal. Therefore, even if an on-screen display device that operates only on a clock lower in speed than the dot clock synchronized with the video signal that is used, a high-definition on-screen display can be made based on the dot clock. Moreover, even for video signals processed in parallel in a plurality of phases, a high-definition display can be made per dot of the on-screen signal.

According to a third aspect, further to the first aspect, the OSD generating part generates the predetermined on-screen signal based on information (hereinafter, OSD information)

about whether high-definition OSD can be made and a position of a horizontal period for starting OSD determined by an input signal for OSD, an OSD maximum video display period, a horizontal synchronizing signal, the write clock, and the read clock, and the line memory carries out write and read processing on timing based on the OSD information.

According to a fourth aspect, further to the second aspect, the OSD generating part generates the predetermined on-screen signals based on information (OSD information) about whether high-definition OSD can be made and a position of a horizontal period for starting OSD determined by an input signal for OSD, an OSD maximum video display period, a horizontal synchronizing signal, the write clock, and the read clock, and the control part and the plurality of line memories carry out write and read processing in parallel on timing based on the OSD information.

A fifth aspect is directed to a video display method for inserting a predetermined on-screen signal into a video signal. The video display method in accordance with the fifth aspect of the present invention comprises writing the predetermined on-screen signal in a line memory in synchronization with a write clock (which is lower in speed than a read clock), reading the on-screen signal written in the line memory in synchronization with the read clock which is a dot clock of the video signal, and
inserting the on-screen signal read from the line memory into a predetermined period of the video signal.

As described above, according to the fifth aspect, the on-screen signal is written once in the line memory on a conventional clock of low speed, and then read on a clock of high speed synchronized with the video signal. Therefore, even if an on-screen display device that operates only on a clock lower in speed than the dot clock synchronized with the video signal that is used, a high-definition on-screen display can be made based on the dot clock.

A sixth aspect is directed to a video display method for inserting predetermined on-screen signals into video signals processed in parallel. The video display method in accordance with the sixth aspect of the present invention comprises writing in parallel the predetermined on-screen signals in a plurality of line memories in synchronization with each predetermined write clock (which is lower in speed than a read clock), reading the on-screen signals written in the plurality of line memories in synchronization with the read clock which is a dot clock of the video signal, and inserting the on-screen signals read by the plurality of line memories into predetermined periods of the plurality of video signals.

As described above, according to the sixth aspect, the on-screen signals are written once in parallel in the plurality of line memories on a conventional clock of low speed, and then read in parallel on a clock of high speed synchronized with the video signal. Therefore, even if an on-screen display device that operates only on a clock lower in speed than the dot clock synchronized with the video signal that is used, a high-definition on-screen display can be made based on the dot clock. Moreover, even for video signals processed in parallel in a plurality of phases, high-definition display can be made per dot of the on-screen signal.

According to a seventh aspect, further to the fifth aspect, the predetermined on-screen signal is generated based on information (OSD information) about whether high-definition OSD can be made and a position of a horizontal period for starting OSD determined by an input signal for OSD, an OSD maximum video display-period, a horizontal synchronizing signal, the write clock, and the read clock, and the writing and the reading are carried out on timing based on the OSD information.

According to an eighth aspect, further to the sixth aspect, the predetermined on-screen signals are generated based on information (OSD information) about whether high-definition OSD can be made and a position of a horizontal period for starting OSD determined by an input signal for OSD, an OSD maximum video display period, a horizontal synchronizing signal, the write clock, and the read clock, and the writing and the reading are carried out in parallel on timing based on the OSD information.

BRIEF DESCRIPTION OF THE DRAWINGS

FIGS. 4(a)–4(i) are diagrams showing one example of timing of each signal in a 1H line shown in FIG. 3 in the video display apparatus according to the first embodiment of the present invention.

FIGS. 6(a)–6(j) are diagrams showing one example of timing of each signal in the 1H line shown in FIG. 3 in the video display apparatus according to the second embodiment of the present invention.

BEST MODE FOR CARRYING OUT THE INVENTION

First Embodiment

Figure 1:
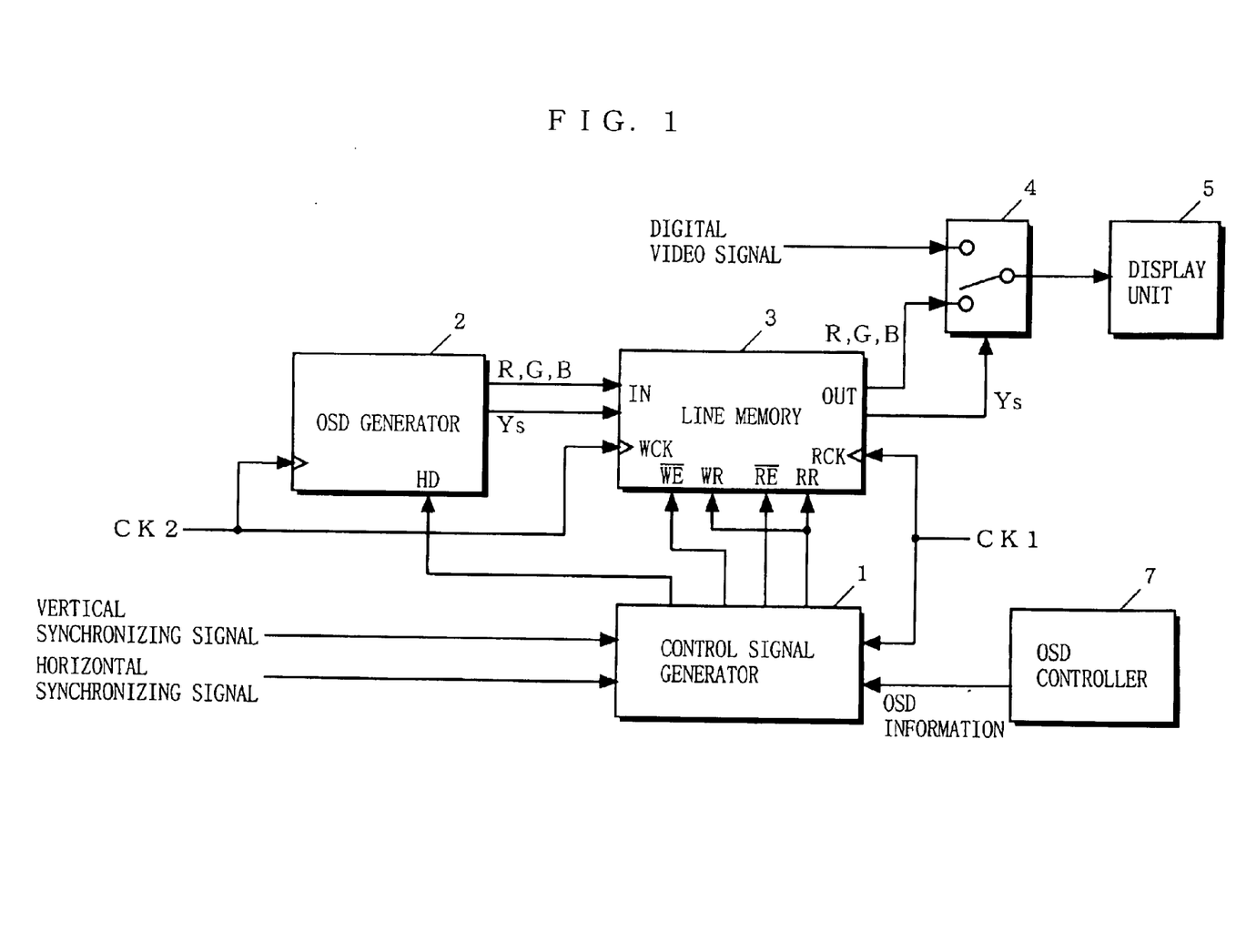
FIG. 1 is a block diagram showing the structure of a video display apparatus according to a first embodiment of the present invention.

FIG. 1 is a block diagram showing the structure of a video display apparatus according to a first embodiment of the present invention. In FIG. 1, the video display apparatus according to the first embodiment includes a control signal generator 1, an on-screen display (hereinafter abbreviated as OSD) generator 2, a line memory 3, a switching part 4, a display unit 5, and an OSD controller 7.

Figure 2:
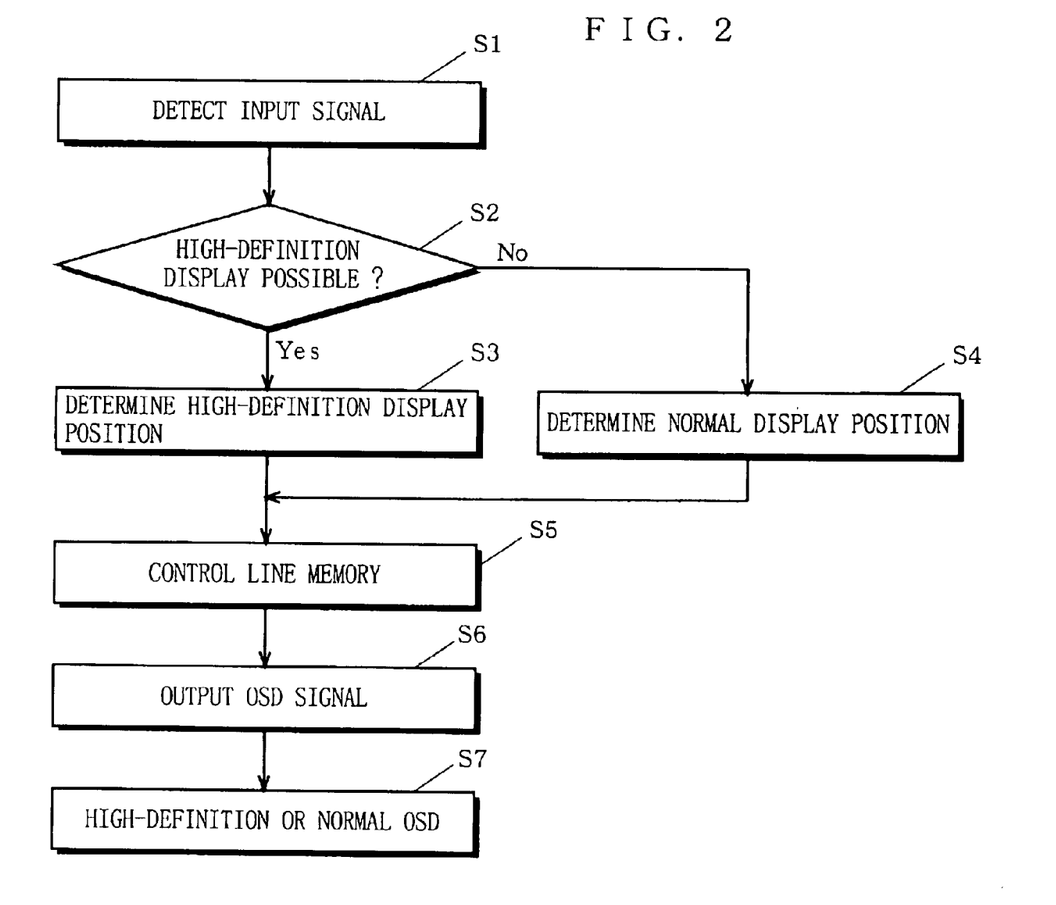
FIG. 2 is a flow chart showing a flow for OSD in the video display apparatus according to the first embodiment of the present invention.

FIG. 2 is a flow chart showing a flow for OSD in the video display apparatus according to the first embodiment of the present invention.

With reference to FIGS. 1 and 2, the operation of each component of the video display apparatus according to the first embodiment is first described.

The OSD controller 7 detects an input signal for OSD (step S1). Then, the OSD controller 7 determines whether OSD is possible with high definition (step S2). This is done based on an OSD maximum video display period (a period predetermined depending on how many characters should be displayed in maximum during a horizontal period), a horizontal synchronizing signal, a first clock signal (hereinafter, CK1) that is identical to a dot clock synchronized with a video signal, and a second clock signal (hereinafter, CK2) not synchronized with the video signal. Specifically, the OSD controller 7 determines that high-definition display is possible if a relation represented by the following equation is satisfied where a ratio of a valid period of the video signal to a horizontal synchronizing signal period is taken as a $(0 \leq \alpha \leq 1)$.

$$\alpha \times CK1 \leq CK2 \leq CK1$$

Furthermore, the OSD controller 7 determines a position of the horizontal period for starting OSD, based on the input signal, CK1, and CK2 (steps S3, S4). If OSD cannot be made in one horizontal line (hereinafter, 1H line) due to the input signal (for example, if OSD wraps around to the next 1H line), the OSD controller 7 determines the position in one 1H line before.

The OSD controller 7 then provides the control signal generator 1 with information, such as whether high-definition display can be made, the display position, the contents of OSD that correspond to the input signal, as OSD information.

The control signal generator 1 receives the horizontal synchronizing signal, vertical synchronizing signal, CK1, and the OSD information from the OSD controller 7. Then, the control signal generator 1 determines, based on the OSD information, which on-screen display is made during which period, and outputs a control signal indicative of the determination to the OSD generator 2 in synchronization with CK1. The control signal generator 1 outputs, in synchronization with CK1 to the line memory 3, a reset signal that provides a starting position of the valid period of the video signal in the 1H line, a write-enable signal that provides an instruction for writing in the line memory 3, and a read-enable signal that provides an instruction for reading therein (step S5). If OSD with high-definition cannot be made (normal OSD), the control signal generator 1 outputs the write-enable and read-enable signals of the same timing.

The OSD generator 2 receives CK2 and the control signal outputted from the control signal generator 1. Based on the control signal, the OSD generator 2 outputs, in synchronization with CK2 to the line memory 3, a $Y_s$ signal that provides a period for on-screen display and signals obtained by converting the contents to be displayed during that period into original colors RGB (step S6).

The line memory 3 is a dual-port line memory that operates on different clocks when reading and writing. The line memory 3 writes the inputted R, G, and B signals and $Y_s$ signal therein in synchronization with CK2, and reads the written R, G, and B signals and $Y_s$ signal there from in synchronization with CK1. Here, the line memory 3 resets writing/reading processing based on the reset signal outputted from the control signal generator 1, and carries out writing/reading processing based on the enable signal outputted from the control signal generator 1. If OSD with high definition cannot be made (normal OSD), the line memory 3 reads the written R, G, and B signals and $Y_s$ signal therefrom in synchronization with CK2. The read R, G, and B signals and $Y_s$ signal are provided to the switching part 4.

The switching part 4 receives the R, G, and B signals outputted from the line memory 3 and a digital video signal, and selectively switches among these signals to be outputted to the display device 5 based on the $Y_s$ signal outputted from the line memory 3.

The display unit 5 is, for example, an LCD, and displays the signal selected by the switching part 4 on a screen (step S7).

Figure 3:
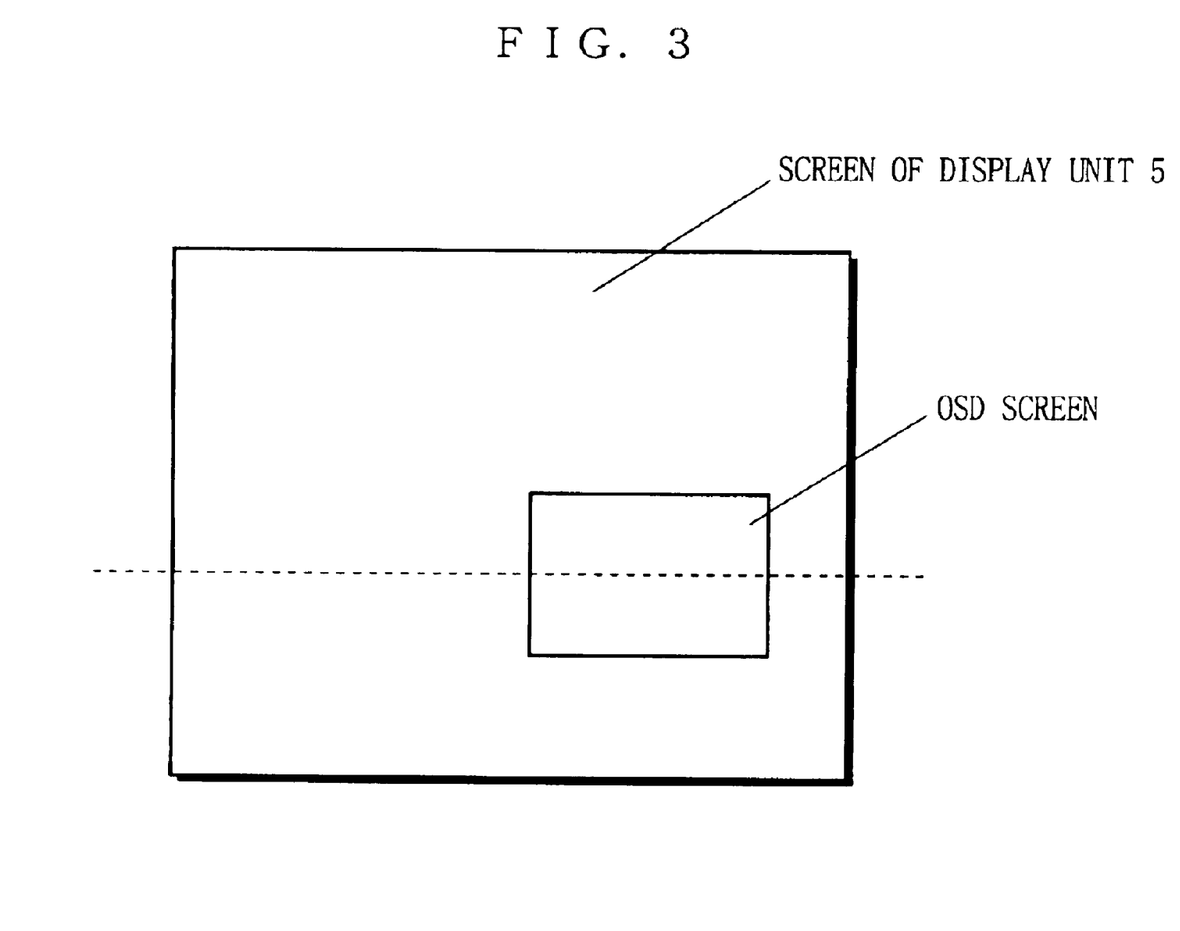
FIG. 3 is a diagram showing one example of on-screen display.
Figures 4A, 4I:
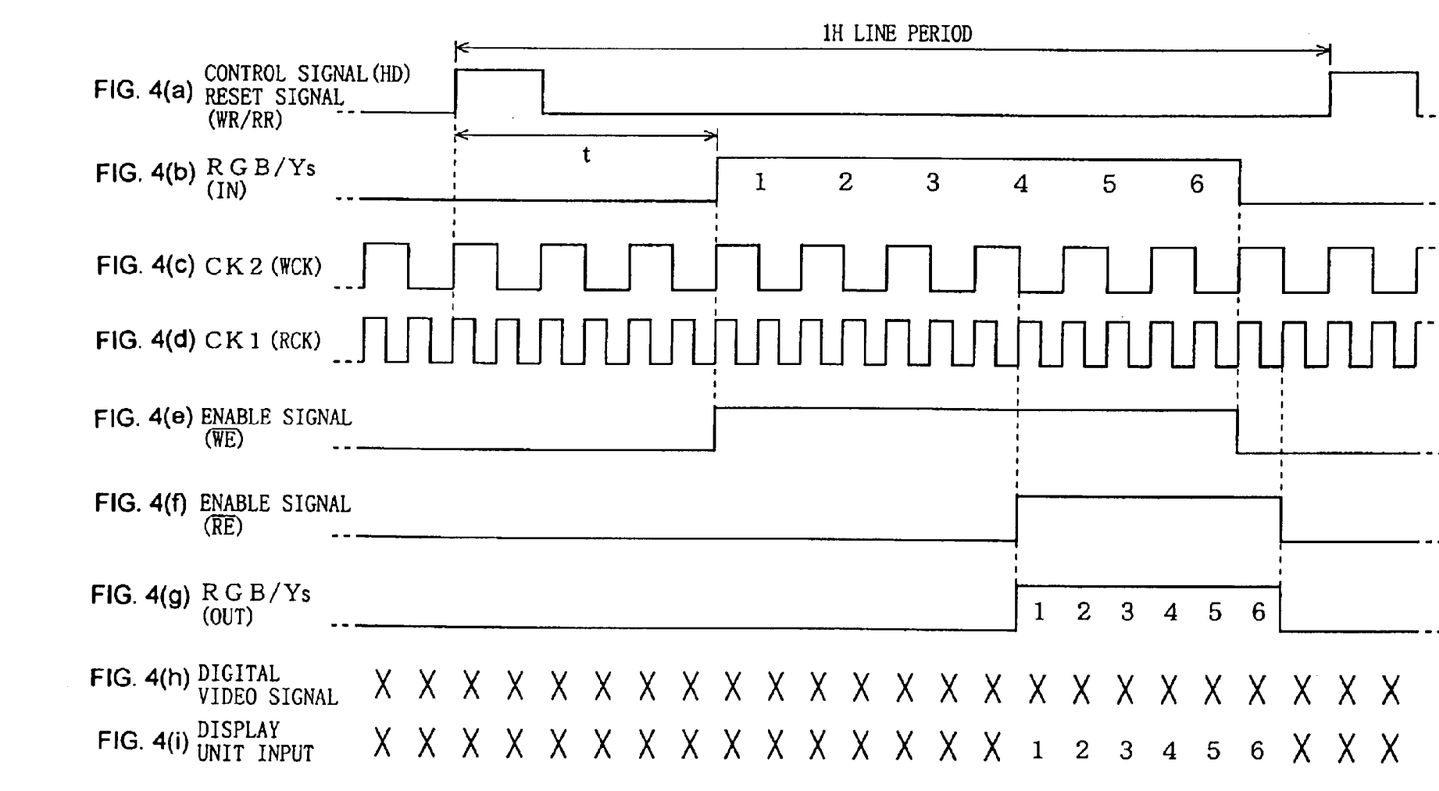

Next, with reference further to FIGS. 3 and 4, the operation of the video display apparatus according to the first embodiment is specifically described by citing one example.

FIG. 3 is a diagram showing one example of on-screen display. In FIG. 3, a case where white, rectangular on-screen display is made on the screen of the display unit 5 is shown.

FIGS. 4(a)–4(i) are diagrams showing timing of each signal in the 1H line indicated by a broken line shown in FIG. 3. Note that it is assumed in FIGS. 4(a)–4(i) that white, rectangular horizontal data shown in FIG. 3 is composed of six pieces of data (in FIGS. 4(a)–4(i), indicated by 1 to 6 as a simulation). Moreover, it is assumed that CK1 is a clock that is equal in frequency to the dot clock synchronized with the video signal (FIG. 4(d)), while CK2 is a clock of half the frequency of CK1 (FIG. 4(c)).

First, the control signal generator 1 generates, based on the horizontal synchronizing signal, the control signal that provides the starting position of the valid period of the video signal in the 1H line and the reset signal (FIG. 4(a)), and outputs the generated signals to the OSD generator 2 and the line memory 3. The OSD generator 2 outputs, to the line memory 3, signals indicating the OSD information further provided by the control signal generator 1, that is, the R, G, and B signals and $Y_s$ signal (FIG. 4(b)) for white on-screen display of six data after a period t has elapsed since the control signal is provided, as shown in FIGS. 4(a)–4(i).

In this example, white on-screen display is described, and therefore the R, G, and B signals and the $Y_s$ signal become identical in waveform. For green on-screen display, for example, it is needless to say that the G signal and the $Y_s$ signal become identical in waveform shown in FIG. 4(b), and the R and B signals are always Lo outputs.

Next, the control signal generator 1 outputs the write-enable signal (FIG. 4(e)) to the line memory 3 so that the line memory 3 can carry out writing of six pieces of data based on the OSD information after the above period t has elapsed. Then, the line memory 3 sequentially writes the received R, G, and B signals and $Y_s$ signal (FIG. 4(b)) in its memory area in synchronization with CK2 during a period when the write-enable signal (FIG. 4(e)) is provided.

On the other hand, the control signal generator 1 determines the data size of the R, G, and B signals and $Y_s$ signal (FIG. 4(b)) to be written, and outputs the read-enable signal (FIG. 4(f)) to the line memory 3 when the line memory 3 becomes able to sequentially read the signals written in the memory area. In this example, CK2 is a clock of half the frequency of CK1, and therefore the read-enable signal (FIG. 4(f)) starts immediately after the time required for writing three pieces of data, which is half of all six, (that is, three clocks of CK2) and half a period of CK2 have elapsed.

Then, when receiving the read-enable signal (FIG. 4(f)), the line memory 3 reads, in synchronization with CK1, the R, G, and B signals and the $Y_s$ signal (FIG. 4(g)) written in the memory area while also carrying out the writing processing, and outputs these signals to the switching part 4.

Next, the switching part 4 receives the R, G, and B signals (FIG. 4(g)) outputted from the line memory 3 and synchronized with CK1 (that is, synchronized with the dot clock of the video signal), and the digital video signal (FIG. 4(h)), selectively switches among these signals based on the $Y_s$ signal (FIG. 4(g)) synchronized with CK1 outputted from the line memory 3, and then outputs the switched signal (FIG. 4(i)) to the display unit 5.

The display unit 5 displays the signal selected by the switching part 4 on the screen.

As stated above, according to the video display apparatus according to the first embodiment of the present invention, the dual-port line memory 3 is used. The on-screen signal is written once in the line memory 3 on the conventional clock (CK2) of low speed, and then read on the clock (CK1) of high speed synchronized with the video signal.

Therefore, even if an on-screen display device that operates only on a clock lower in speed than the dot clock synchronized with the video signal that is used, high-definition on-screen display can be made based on the dot clock.

Second Embodiment

As stated above, the method for reducing apparent processing time by parallel processing when a video dot clock is high is widely used. However, if the video signal is subjected to parallel processing in two phases, and the on-screen signal is superposed thereon as described in the first embodiment, the resolution of on-screen display is decreased by half, and the size per character is increased.

Therefore, a video display apparatus according to a second embodiment of the present invention is to allow parallel processing without degrading the resolution of the on-screen display and decreasing the size per character.

Figure 5:
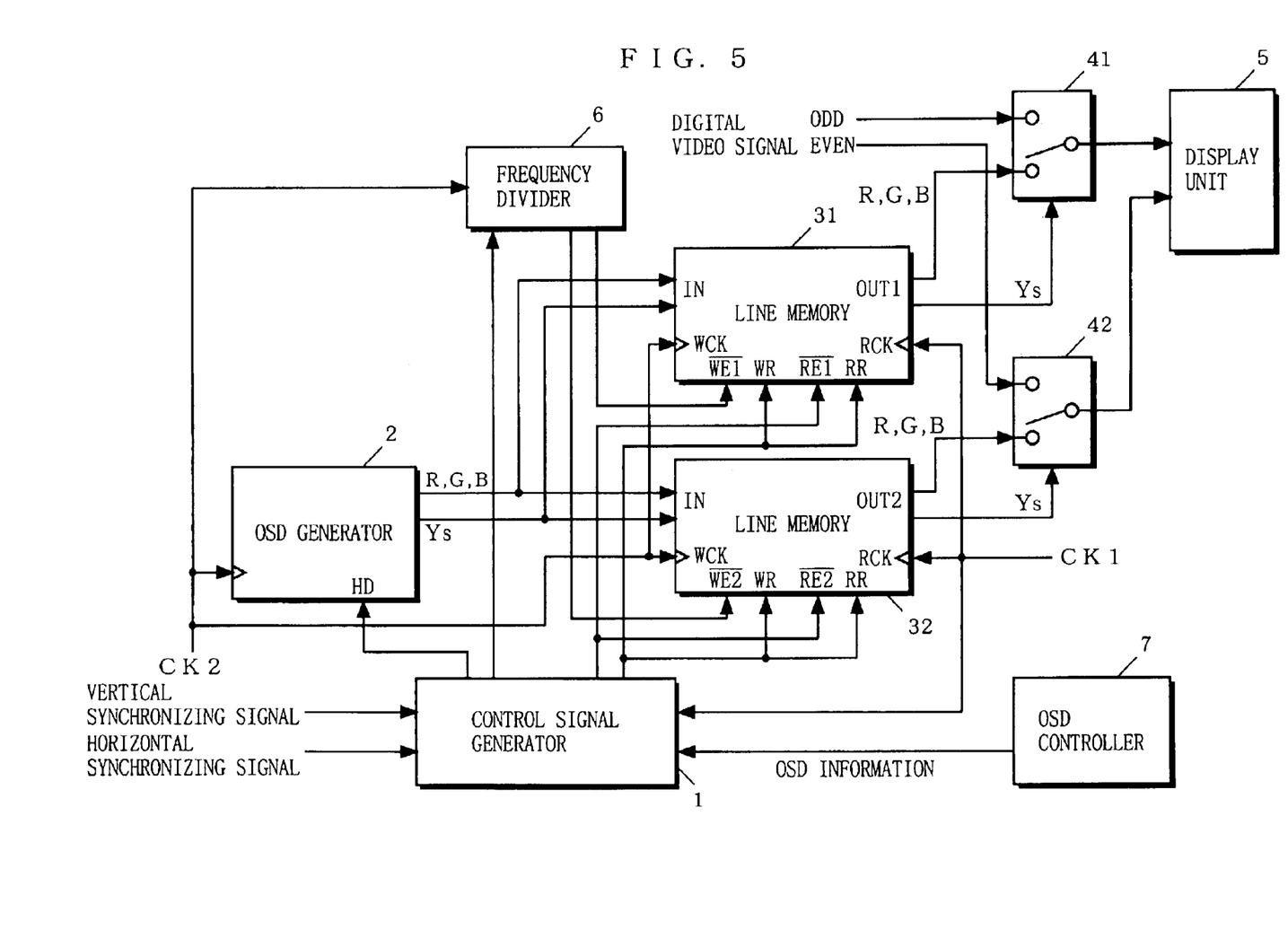
FIG. 5 is a block diagram showing the structure of a video display apparatus according to a second embodiment of the present invention.

FIG. 5 is a block diagram showing the video display apparatus according to the second embodiment of the present invention. In FIG. 5, the video display apparatus according to the second embodiment includes the control signal generator 1, the on-screen display (OSD) generator 2, line memories 31 and 32, switching parts 41 and 42, the display unit 5, a frequency divider 6, and the OSD controller 7.

With reference to FIGS. 5 and 2, the operation of each component of the video display apparatus according to the second embodiment is first described.

Similarly to the above first embodiment, the OSD controller 7 detects an input signal for OSD (FIG. 2, step S1). Then, the OSD controller 7 determines whether OSD is possible with high definition. This is done based on the OSD maximum video display period, the horizontal synchronizing signal, CK1 which is a clock identical to the dot clock synchronized with the video signal, and CK2 which is a clock not synchronized with the video signal (FIG. 2, step S2). Specifically, the OSD controller 7 determines that high-definition display is possible if a relation represented by the following equation is satisfied where a ratio of a valid period of the video signal to a horizontal synchronizing signal period is taken as a $(0 \leq \alpha \leq 1)$.

$$\alpha \times CK1 \leq CK2 \leq CK1$$

Furthermore, the OSD controller 7 determines a position of the horizontal period for starting OSD, based on the input signal, CK1, and CK2 (FIG. 2, steps S3, S4). If OSD cannot be made in one 1H line due to the input signal, the OSD controller 7 determines the position in one 1H line before.

The OSD controller 7 then provides the control signal generator 1 with information such as whether high-definition display can be made, the display position, and the contents of OSD that correspond to the input signal, as OSD information.

The control signal generator 1 receives the horizontal synchronizing signal, vertical synchronizing signal, CK1, and the OSD information from the OSD controller 7. Then, the control signal generator 1 determines, based on the OSD information, which on-screen display is made during which period, and outputs a control signal indicative of the determination to the OSD generator 2 in synchronization with CK1. For outputting predetermined write-enable signals for providing instructions for writing in the line memories 31 and 32, the control signal generator 1 controls the frequency divider 6. The control signal generator 1 also outputs, in synchronization with CK1 to the line memories 31 and 32, reset signals that provide a starting position of the valid period of the video signal in the 1H line, and read-enable signals that provide an instruction for reading therein (FIG. 2, step S5). If OSD in high-definition cannot be made (normal OSD), the control signal generator 1 outputs the write-enable and read-enable signals of the same timing.

The OSD generator 2 receives CK2 and the control signal outputted from the control signal generator 1. Based on the control signal, the OSD generator 2 outputs, in synchronization with CK2 to the line memories 31 and 32, $Y_s$ signals that provide a period for on-screen display and signals obtained by converting the contents to be displayed during that period into original colors RGB (FIG. 2, step S6).

The frequency divider 6 divides the frequency of the received CK2 in half, and outputs a clock to the line memories 31 and 32 only during a predetermined period based on the write-enable signal outputted from the control signal generator 1.

Each of the line memories 31 and 32 is a dual-port line memory that operates on different clocks when reading and writing, writes the inputted R, G, and B signals and $Y_s$ signal therein in synchronization with CK2, and reads the written R, G, and B signals and $Y_s$ signal therefrom in synchronization with CK1. Here, the line memories 31 and 32 each reset writing/reading processing based on the reset signal outputted from the control signal generator 1, carry out writing processing based on the clock outputted by the frequency divider 6, and carry out reading processing based on the enable signal outputted from the control signal generator 1. If OSD with high definition cannot be made (normal OSD), the line memory 3 reads the written R, G, and B signals and $Y_s$ signal therefrom in synchronization with CK2. The read R, G, and B signals and $Y_s$ signal are provided to the switching parts 41 and 42.

The switching part 41 receives the R, G, and B signals outputted from the line memory 31 and odd lines (ODD) of the digital video signal, and selectively switches an odd-line signal to be outputted to the display device 5 based on the $Y_s$ signal outputted from the line memory 31. The switching part 42 receives the R, G, and B signals outputted from the line memory 32 and even lines (EVEN) of the digital video signal, and selectively switches an even-line signal to be outputted to the display device 5 based on the $Y_s$ signal outputted from the line memory 32.

The display unit 5 is, for example, an LCD, and sequentially displays the odd-line/even-line signals selected by the switching parts 41 and 42 on the screen (FIG. 2, step S7).

Figures 6A, 6J:
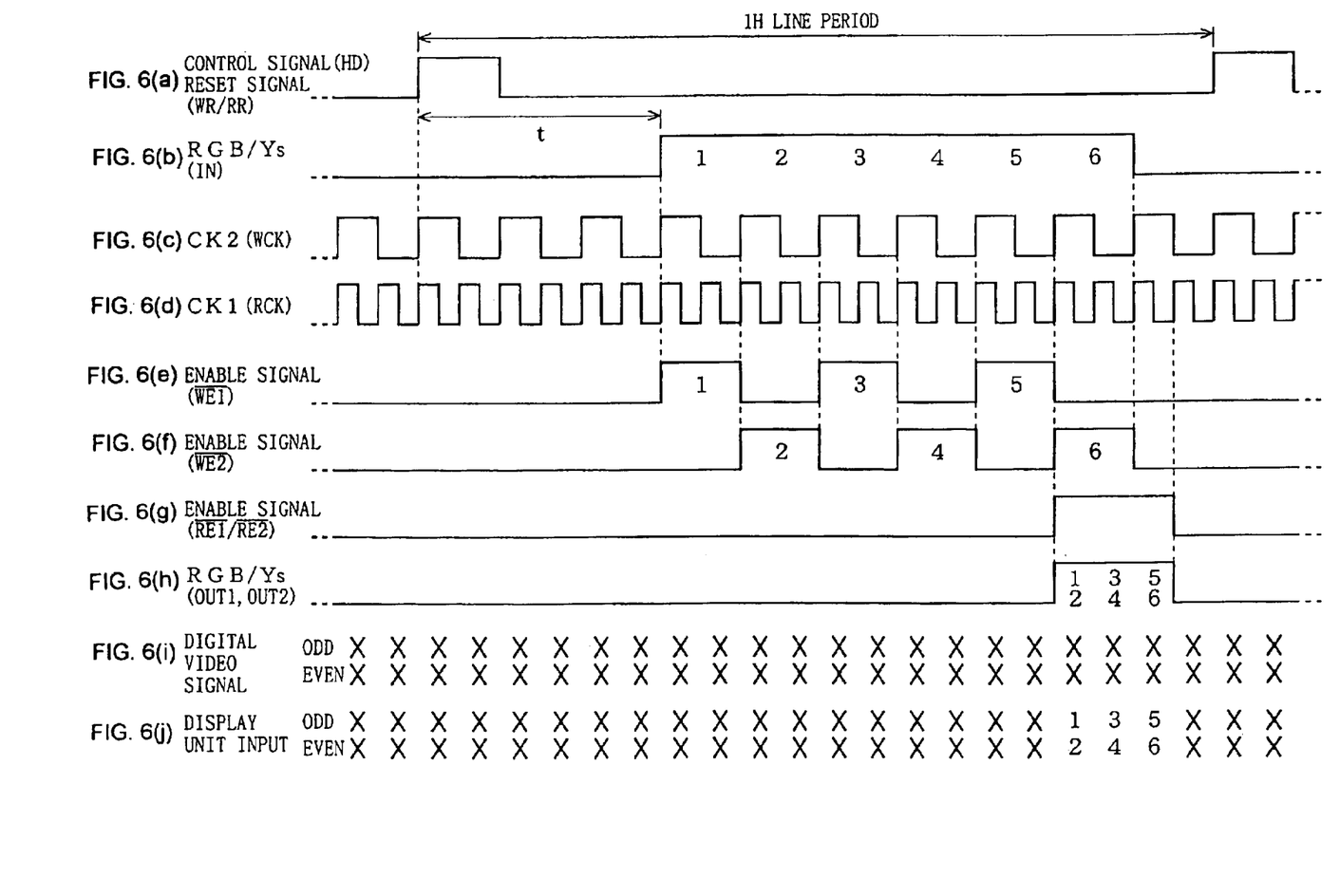

With reference further to FIGS. 3 and 6, the operation of the video display apparatus according to the second embodiment is specifically described by citing one example.

FIGS. 6(a)-6(j) are diagrams showing timing of each signal in the 1H line indicated by the broken line shown in FIG. 3. Note that it is assumed in FIGS. 6(a)–6(j) that white, rectangular horizontal data shown in FIG. 3 is composed of six pieces of data (in FIGS. 6(a)–6(j), indicated by 1 to 6 as a simulation). Moreover, it is assumed that CK1 is a clock that is equal in frequency to the dot clock synchronized with the video signal (FIG. 6(d)), while CK2 is a clock of half the frequency of CK1 (FIG. 6(c)).

First, the control signal generator 1 generates, based on the horizontal synchronizing signal, the control signal that provides the starting position of the valid period of the video signal in the 1H line and the reset signal (FIG. 6(a)), and outputs the generated signals to the OSD generator 2 and the line memories 31 and 32. The OSD generator 2 outputs, to the line memories 31 and 32, signals indicating the OSD information further provided by the control signal generator 1, that is, the R, G, and B signals and $Y_s$ signal (FIG. 6(b)) for white on-screen display of six data after the period t has elapsed since the control signal is provided, as shown in FIGS. 6(a)–6(j).

In this example, white on-screen display is described, and therefore the R, G, and B signals and the $Y_s$ signal become identical in waveform. For green on-screen display, for example, it is needless to say that the G signal and the $Y_s$ signal become identical in waveform shown in FIG. 6(b), and the R and B signals are always Lo outputs.

Next, the control signal generator 1 outputs the write-enable signal (whose waveform is identical to that shown in FIG. 6(b)) to the frequency divider 6 so that the line memories 31 and 32 can carry out in parallel writing of six pieces of data based on the OSD information after the above period t has elapsed. The frequency divider 6 divides the received CK2 by half, and outputs odd clocks (FIG. 6(e)) to the line memory 31 for odd-line processing, while outputting even clocks (FIG. 6(f))to the line memory 32 for even-line processing during a period of the write-enable signal outputted from the control signal generator 1. Then, the line memory 31 sequentially writes the received R, G, and B signals and $Y_s$ signal (FIG. 6(b)) in its memory area in synchronization with the odd clocks (FIG. 6(e)), while the line memory 32 sequentially writes the received R, G, and B signals and $Y_s$ signal (FIG. 6(b)) in its memory area in synchronization with the even clocks (FIG. 6(f)).

On the other hand, the control signal generator 1 determines the data size of the R, G, and B signals and $Y_s$ signal (FIG. 6(b)) to be written, and outputs read-enable signals (FIG. 6(g)) to the line memories 31 and 32 when the line memories 31 and 32 become able to sequentially read the signals written in their memory areas. In this example, CK2 is a clock of half the frequency of CK1, and data to be read by the line memories 31 and 32 are halved therebetween. Therefore, the timing is as shown in FIG. 6(g).

Then, when receiving the read-enable signal (FIG. 6(g)), the line memories 31 and 32 each read, in synchronization with CK1, the R, G, and B signals and the $Y_s$ signal (FIG. 6(h)) written in their memory areas while also carrying out the writing processing, and outputs these signals to the switching parts 41 and 42.

Next, the switching part 41 receives the R, G, and B signals (FIG. 6(h), upper side) outputted from the line memory 31 and synchronized with CK1 (that is, synchronized with the dot clock of the video signal), and the digital video signal (FIG. 6(i)), selectively switches among these signals based on the $Y_s$ signal (FIG. 6(h)) synchronized with CK1 outputted from the line memory 31, and then outputs the switched odd-line signal (FIG. 6(j), upper side) to the display unit 5. The switching part 42 receives the R, G, and B signals (FIG. 6(h), lower side) outputted from the line memory 32 and synchronized with CK1 (that is, synchronized with the dot clock of the video signal), and the digital video signal (FIG. 6(i)), selectively switches among these signals based on the $Y_s$ signal (FIG. 6(h)) synchronized with CK1 outputted from the line memory 32, and then outputs the switched odd-line signal (FIG. 6(j), lower side) to the display unit 5.

The display unit 5 displays the odd-line and even-line signals selected by the switching parts 41 and 42, respectively, on the screen.

As stated above, according to the video display apparatus according to the second embodiment of the present invention, two dual-port line memories 31 and 32 are used. The odd-line data and even-line data of the on-screen signal are once written in parallel into the line memories 31 and 32 on the conventional clock (CK2) of low speed, and then the written on-screen signals are read in parallel on the clock (CK1) of high speed synchronized with the video signal.

Therefore, even an on-screen display device that can operate only on a clock lower in speed than the dot clock synchronized with the video signal that is used, a high-definition on-screen display can be made based on the dot clock. Moreover, even for video signals subjected to two-phase parallel processing, high-definition on-screen signal display can be made per dot.

Note that, in the above second embodiment, a case where the video signal subjected to two-phase parallel processing is to be processed is described. If the line memories are provided as many as phases, and clocks outputted from the frequency divider 6 are made to correspond thereto, video signals subjected to parallel processing in more than two phases can be processed by applying the present invention.

Also, the timing charts (FIGS. 4(a)–4(i) and 6(a)–6(j)) described in the above first and second embodiments are for example only, and the polarities of the signals may be inverted as long as each component according to the present invention can operate correctly.

Still further, in the above first and second embodiments, the control signal generator 1 and the OSD generator 2 are constructed separately. However, these components may be constructed in one through integration, for example.

INDUSTRIAL APPLICABILITY

As stated above, when providing video display of various video signals such as a computer signal, NTSC signal, and high-definition signal and also providing on-screen display, the video display apparatus and method of the present invention can be used, even if an on-screen display device that operates only on a clock lower in speed than a dot clock synchronized with a video signal that is used, to allow high-definition on-screen display based on the dot clock.

What is claimed is:

1. A video display apparatus for superposing a predetermined on-screen signal with a video signal, said video display apparatus comprising:

OSD generating means for generating the predetermined on-screen signal and outputting the predetermined on-screen signal and an OSD period signal indicating an on-screen display period;

a dual-port line memory for storing the on-screen signal and the OSD period signal which are outputted from said OSD generating means in synchronization with a write clock that is lower in speed than a dot clock of the video signal and increasing speeds of the on-screen signal and the OSD period signal to output the on-screen signal and the OSD period signal in synchronization with a read clock which is equal in speed to the dot clock of the video signal, such that a number of pixels of an on-screen display image is not changed between write and read operations; and switching means for receiving the video signal and the on-screen signal with the increased speed and selecting either the on-screen signal with the increased speed or the video signal based on the OSD period signal with the increased speed, such that the on-screen signal with the increased speed is outputted during the on-screen display period indicated by the OSD period signal with the increased speed and the video signal is outputted during a display period other than the on-screen display period.

2. A video display apparatus for inserting predetermined on-screen signals into a plurality of video signals processed in parallel, said video display apparatus comprising:

OSD generating means for generating the predetermined on-screen signals and outputting the predetermined on-screen signals, and OSD period signals indicating an on-screen display period;

a plurality of dual-port line memories for storing the on-screen signals and OSD period signals which are outputted from said OSD generating means in synchronization with each predetermined write clock that is lower in speed than a dot clock of the video signals and increasing speeds of the on-screen signals and the OSD period signals to output the on-screen signals and the OSD period signals in synchronization with a read clock which is equal in speed to the dot clock of the video signals, such that a number of pixels of an on-screen display image is not changed between write and read operations;

control means for controlling timing of each write clock so that said plurality of line memories can carry out storing in parallel; and a plurality of switching means for receiving the video signals and the on-screen signals with the increased speed and selecting either the on-screen signals with the increased speed or the video signals based on the OSD period signals with the increased speed, such that the on-screen signals with the increased speed are outputted during the on-screen display periods indicated by the OSD period signals with the increased speed and the video signals are outputted during display periods other than the on-screen display periods.

3. The video display apparatus according to claim 1, further comprising OSD control means for generating OSD information consisting of information about whether high-definition OSD can be made and information about a position of a horizontal period for starting OSD by: determining whether the write clock and the read clock are in such a relationship as to enable the high definition OSD, based on an OSD maximum video display period, a horizontal synchronizing signal, the write clock and the read clock; and in accordance with a result of the determination, determining the position of the horizontal period for starting the OSD based on an input signal for OSD, the write clock, and the read clock, wherein said OSD generating means is operable to generate the predetermined on-screen signal based on the OSD information, and wherein said line memory is operable to carry out write and read processing on timing based on the OSD information.

4. The video display apparatus according to claim 2, further comprises OSD control means for generating OSD information consisting of information about whether high-definition OSD can be made and information about a position of a horizontal period for starting OSD by: determining whether the write clock and the read clock are in such a relationship as to enable the high definition OSD based on an OSD maximum video display period, a horizontal synchronizing signal, the write clock and the read clock; and in accordance with a result of the determination, determining the position of the horizontal period for starting the OSD based on an input signal for OSD, the write clock, and the read clock, wherein said OSD generating means is operable to generate the predetermined on-screen signals based on the OSD information, and wherein said control means and said plurality of line memories are operable to carry out write and read processing in parallel on timing based on the OSD information.

5. A video display method for superposing a predetermined on-screen signal with a video signal, said method comprising:

storing the predetermined on-screen signal and an OSD period signal in a line memory in synchronization with a write clock that is lower in speed than a dot clock of the video signal;

increasing speeds of the on-screen signal and the OSD period signal;

outputting the on-screen signal and the OSD period signal written in the line memory in synchronization with a read clock which is equal in speed to the dot clock of the video signal, such that a number of pixels of an on-screen display image is not changed between said storing and said outputting; and receiving the video signal and the on-screen signal with the increased speed and selecting either the on-screen signal with the increased speed or the video signal based on the OSD period signal with the increased speed, such that the on-screen signal with the increased speed is outputted during the on-screen display period indicated by the OSD period signal with the increased speed and the video signal is outputted during a display period other than the on-screen display period.

6. A video display method for superposing predetermined on-screen signals with video signals processed in parallel, said method comprising:

storing in parallel the predetermined on-screen signals and OSD period signals in a plurality of line memories in synchronization with each predetermined write clock that is lower in speed than a dot clock of the video signals;

increasing speeds of the on-screen signals and the OSD period signals;

outputting the on-screen signals and the OSD period signals written in the plurality of line memories in synchronization with a read clock which is equal in speed to the dot clock of the video signals, such that a number of pixels of an on-screen display image is not changed between said storing and said outputting; and receiving the video signals and the on-screen signals with the increased speed and selecting either the on-screen signals with the increased speed or the video signals based on the OSD period signal with the increased speed, such that the on-screen signals with the increased speed are outputted during on-screen display periods indicated by the OSD period signals with the increased speed and the video signals are outputted during display periods other than the on-screen display periods.

7. The video display method according to claim 5, further comprising:

determining whether the write clock and the read clock are in such a relationship as to enable high definition OSD based on an OSD maximum video display period, a horizontal synchronizing signal, the write clock and the read clock; accordance with a result of the determination, determining a position of a horizontal period for starting OSD based on an inpit signal for OSD, the write clock, and the read clock, and generating OSD information consisting of information about whether the high definition OSD can be made and information about the position of the horizontal period for starting the OSD, wherein the predetermined on-screen signal is generated based on the OSD information, and wherein said writing and said reading are carried out on timing based on the OSD information.

8. The video display method according to claim 6, further comprising:

determining whether the write clock and the read clock are in such a relationship as to enable high definition OSD based on an OSD maximum video display period, a horizontal synchronizing signal, the write clock and the read clock; in accordance with a result of the determination, determining a position of a horizontal period for starting OSD based on an input signal for OSD, the write clock, and the read clock, and generating OSD information consisting of information about whether the high definition OSD can be made and information about the position of the horizontal period for starting the OSD, wherein the predetermined on-screen signals are generated based on the OSD information, and wherein said writing and said reading are carried out on timing based on the OSD information.

* * * * *